(12) United States Patent
Jin et al.

(10) Patent No.: US 11,182,591 B2
(45) Date of Patent: Nov. 23, 2021

(54) METHODS AND APPARATUSES FOR DETECTING FACE, AND ELECTRONIC DEVICES

(71) Applicant: SHENZHEN SENSETIME TECHNOLOGY CO, LTD, Shenzhen (CN)

(72) Inventors: Xiao Jin, Shenzhen (CN); Chenchen Hu, Shenzhen (CN); Zhanghui Kuang, Shenzhen (CN); Wei Zhang, Shenzhen (CN)

(73) Assignee: SHENZHEN SENSETIME TECHNOLOGY CO, LTD, Shenzhen (CN)

(*) Notice: Subject to any disclaimer, the term of this patent is extended or adjusted under 35 U.S.C. 154(b) by 170 days.

(21) Appl. No.: 16/423,403

(22) Filed: May 28, 2019

(65) Prior Publication Data

US 2019/0294860 A1 Sep. 26, 2019

Related U.S. Application Data

(63) Continuation of application No. PCT/CN2017/120283, filed on Dec. 29, 2017.

(30) Foreign Application Priority Data

Dec. 31, 2016 (CN) .......................... 201611268022.1

(51) Int. Cl.
*G06K 9/00* (2006.01)
*G06K 9/32* (2006.01)
(Continued)

(52) U.S. Cl.
CPC .......... *G06K 9/00248* (2013.01); *G06K 9/00* (2013.01); *G06K 9/00281* (2013.01);
(Continued)

(58) Field of Classification Search
None
See application file for complete search history.

(56) References Cited

U.S. PATENT DOCUMENTS 9,679,195 B2 6/2017 Xiong et al.
2007/0071288 A1 3/2007 Wu
(Continued)

FOREIGN PATENT DOCUMENTS

CN 102890776 A 1/2013
CN 102902986 A 1/2013
(Continued)

OTHER PUBLICATIONS

English translation for the IDS document—CN 105404845 (Year: 2016).*
(Continued)

*Primary Examiner* — Vikkram Bali
(74) *Attorney, Agent, or Firm* — Syncoda LLC; Feng Ma

(57) ABSTRACT

Methods and apparatuses for detecting a face, and electronic devices include: performing face location on a face image to be detected; performing face attribute detection on the face image based on a face location result; and displaying a face attribute detection result of the face image to be detected. Use experience of face image detection can be improved while diversified requirements of a user for obtaining corresponding face information in a face image from different angles are satisfied.

19 Claims, 6 Drawing Sheets

(51) Int. Cl.
*G06N 3/08* (2006.01)
*G06N 5/04* (2006.01)

(52) U.S. Cl.
CPC ..... *G06K 9/00288* (2013.01); *G06K 9/00308* (2013.01); *G06K 9/3233* (2013.01); *G06N 3/08* (2013.01); *G06N 5/046* (2013.01); *G06K 2009/00322* (2013.01)

(56) References Cited

U.S. PATENT DOCUMENTS

| | | | |
|---|---|---|---|
| 2014/0341422 A1 | 11/2014 | Xiong et al. | |
| 2015/0125049 A1* | 5/2015 | Taigman | G06T 15/205 382/118 |
| 2015/0220774 A1* | 8/2015 | Ebersman | G06F 3/0482 382/118 |
| 2017/0061494 A1* | 3/2017 | Jiang | G06F 16/5838 |
| 2017/0249502 A1 | 8/2017 | Xiong et al. | |
| 2019/0294868 A1* | 9/2019 | Martinez | G06K 9/00281 |

FOREIGN PATENT DOCUMENTS

| | | |
|---|---|---|
| CN | 103824090 A | 5/2014 |
| CN | 104036247 A | 9/2014 |
| CN | 104143079 A | 11/2014 |
| CN | 104866829 A | 8/2015 |
| CN | 105404845 A | 3/2016 |
| CN | 105426850 A | 3/2016 |
| CN | 105654049 A | 6/2016 |
| CN | 106022287 A | 10/2016 |
| CN | 106096538 A | 11/2016 |

OTHER PUBLICATIONS

Spontaneous facial micro-expression detection based on deep learning, by Li et al., 978-1-5090-1345-6/16 (Year: 2016).*
International Search Report in the international application No. PCT/CN2017/120283, dated Apr. 3, 2018.
English translation of the Written Opinion of the International Search Authority in the international application No. PCT/CN2017/120283, dated Apr. 3, 2018.
First Office Action of the Chinese application No. 201611268022.1, dated Apr. 24, 2019.

* cited by examiner

● Basic attributes

☒ Gender　　☐ Face value
　　☒ Race　　　☐ Close Eye
　　☐ Age　　　 ☐ Open Mouth
　　☐ Mask　　　☐ Beards
　　☐ Glasses　 ☐ Select All ● Expression attributes ☐ Anger　　 ☐ Happiness
　　☐ Fear　　　☐ Disgust
　　☐ Sadness　 ☐ Surprise
　　☐ Calmness　☐ Select All

Start

Change Language

FIG. 3

METHODS AND APPARATUSES FOR DETECTING FACE, AND ELECTRONIC DEVICES

CROSS-REFERENCE TO RELATED APPLICATIONS

This is a continuation of International Patent Application No. PCT/CN2017/120283 filed on Dec. 29, 2017, which claims priority to Chinese Patent Application No. CN201611268022.1 filed on Dec. 31, 2016. The disclosures of these applications are incorporated herein by reference in their entirety.

BACKGROUND

In recent years, with the popularization and development of artificial intelligence technologies, detecting an image by using a computer is applied to more and more scenarios. Image detection can provide a lot of convenience for users, for example, detection is performed on an image to obtain a face, and then security verification is performed by using the face, etc.

SUMMARY

The present disclosure relates to artificial intelligence technologies, and in particular, to methods and apparatuses for detecting a face, and electronic devices.

Embodiments of the present disclosure provide solutions for detecting a face.

According to one aspect of the embodiments of the present disclosure, a computer implemented method for detecting a face provided includes: performing face location on a face image to be detected; performing face attribute detection on the face image based on a face location result; and displaying a face attribute detection result of the face image to be detected.

According to another aspect of the embodiments of the present disclosure, an apparatus for detecting a face further provided includes: a processor; and a memory for storing instructions executable by the processor; where execution of the instructions by the processor causes the processor to perform the following operations: performing face location on a face image to be detected; performing face attribute detection on the face image based on a face location result; and displaying a face attribute detection result of the face image to be detected.

According to another aspect of the embodiments of the present disclosure, an apparatus for detecting a face further provided includes: a location module configured to perform face location on a face image to be detected; a detection module configured to perform face attribute detection on the face image based on a face location result; and a display module configured to display a face attribute detection result of the face image to be detected.

According to yet another aspect of the embodiments of the present disclosure, an electronic device further provided includes: a processor and a memory; where the memory is configured to store at least one executable instruction, and the executable instruction enables the processor to execute the method for detecting a face according to any one of the embodiments of the present disclosure.

According to yet another aspect of the embodiments of the present disclosure, an electronic device further provided includes: a processor and the apparatus for detecting a face according to any one of the embodiments of the present disclosure, where when the apparatus for detecting a face is run by the processor, units in the apparatus for detecting a face according to any one of the embodiments of the present disclosure are run.

According to yet another aspect of the embodiments of the present disclosure, a computer program further provided includes a computer-readable code, where when the computer-readable code runs in a device, a processor in the device executes instructions for implementing a computer implemented method for detecting a face as described above.

According to still another aspect of the embodiments of the present disclosure, a computer-readable storage medium further provided is configured to store computer-readable instructions, where when the instructions are executed, the operations in the steps of the computer implemented method for detecting a face as described above.

The following further describes in detail the technical solutions of the present disclosure with reference to the accompanying drawings and embodiments.

BRIEF DESCRIPTION OF DRAWINGS

The accompanying drawings constituting a part of the specification describe embodiments of the present disclosure and are intended to explain the principles of the present disclosure together with the descriptions.

According to the following detailed descriptions, the present disclosure can be understood more clearly with reference to the accompanying drawings.

FIG. 3 is a schematic diagram of an attribute option for face attribute detection in the embodiment shown in FIG. 2;

DETAILED DESCRIPTION

Figure 1:
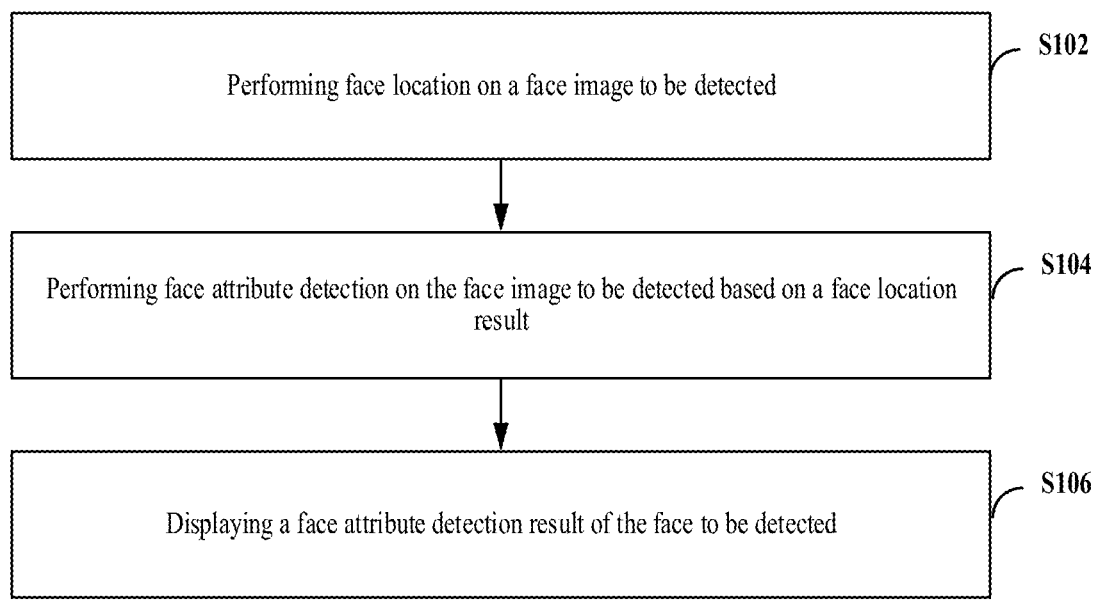
FIG. 1 is a flowchart of a method for detecting a face according to one embodiment of the present disclosure.

The optional implementations of the embodiments of the present disclosure are further described in detail below with reference to the accompanying drawings (the same reference numerals in a plurality of accompanying drawings represent the same elements) and the embodiments. The following embodiments are intended to illustrate the present disclosure, but are not intended to limit the scope of the present disclosure.

A person skilled in the art may understand that the terms such as "first" and "second" in the embodiments of the present disclosure are only used to distinguish different steps, devices or modules, etc., and do not represent any specific technical meaning or an inevitable logical sequence therebetween.

It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (for example, program modules) executed by the computer systems. Generally, the program modules may include routines, programs, target programs, assemblies, logics, data structures, and the like, to perform specific tasks or implement specific abstract data types. The computer systems/servers may be practiced in the distributed cloud computing environments in which tasks are performed by remote processing devices that are linked through a communications network. In the distributed computing environments, the program modules may be located in local or remote computing system storage media including storage devices.

FIG. 1 illustrates a flowchart of a method for detecting a face according to one embodiment of the present disclosure. The method for detecting a face according to the present embodiment includes the following operations.

At S102: face location is performed on a face image to be detected.

Performing face location on a face image to be detected may be implemented by a person skilled in the art in any appropriate manner, which for example includes, but is not limited to: performing face location by means of a trained convolutional neural network, an Active Shape Model (ASM) method, an Active Appearance Model (AAM) method, or the like.

In an optional example, the operation in S102 is performed by a processor by invoking a corresponding instruction stored in a memory, or is performed by a location module 302 run by the processor.

At S104: face attribute detection is performed on the face image to be detected based on a face location result.

The face attribute detection for example includes, but is not limited to: gender detection, age detection, race detection, appearance detection, expression attribute detection, or the like.

The face attribute detection is performed by using, for example, the trained convolutional neural network, a Gabor filter method, a Scale-Invariant Feature Transform (SIFT) method, or the like.

In an optional example, the operation in S104 is performed by a processor by invoking a corresponding instruction stored in a memory, or is performed by a detection module 304 run by the processor.

At S106: a face attribute detection result of the face image to be detected is displayed.

After the face attribute detection is performed, the face attribute detection result is displayed in the face image.

In an optional example, it is able to, but not limited to, use a confidence score to represent the face attribute detection result. For example, the confidence score is used for representing a gender detection result, an age detection result, a race detection result, an appearance detection result, and expression attribute detection result, or the like.

In an optional example, the operation in S106 is performed by a processor by invoking a corresponding instruction stored in a memory, or is performed by a display module 306 run by the processor.

According to the present embodiment, on the basis of performing face location on the face image to be detected, face attribute detection is further performed, where the face attribute detection includes, but is not limited to, gender detection, race detection, age detection, appearance detection, expression attribute detection, or the like, and by means of the face attribute detection, various attribute information in the face image to be detected can be obtained, so as to satisfy diversified requirements of a user for obtaining corresponding face information in the face image from different angles; the face attribute detection result is displayed to the user, so that the user can learn the detection result more clearly, and use experience of face image detection can be improved while the requirements are satisfied.

The method for detecting a face according to the present embodiment is executed by any appropriate device having data processing capability, for example, including, but not limited to, a mobile terminal, a Personal Computer (PC), a server, a vehicle-mounted device, an entertainment device, an advertisement device, or the like.

Figure 2:
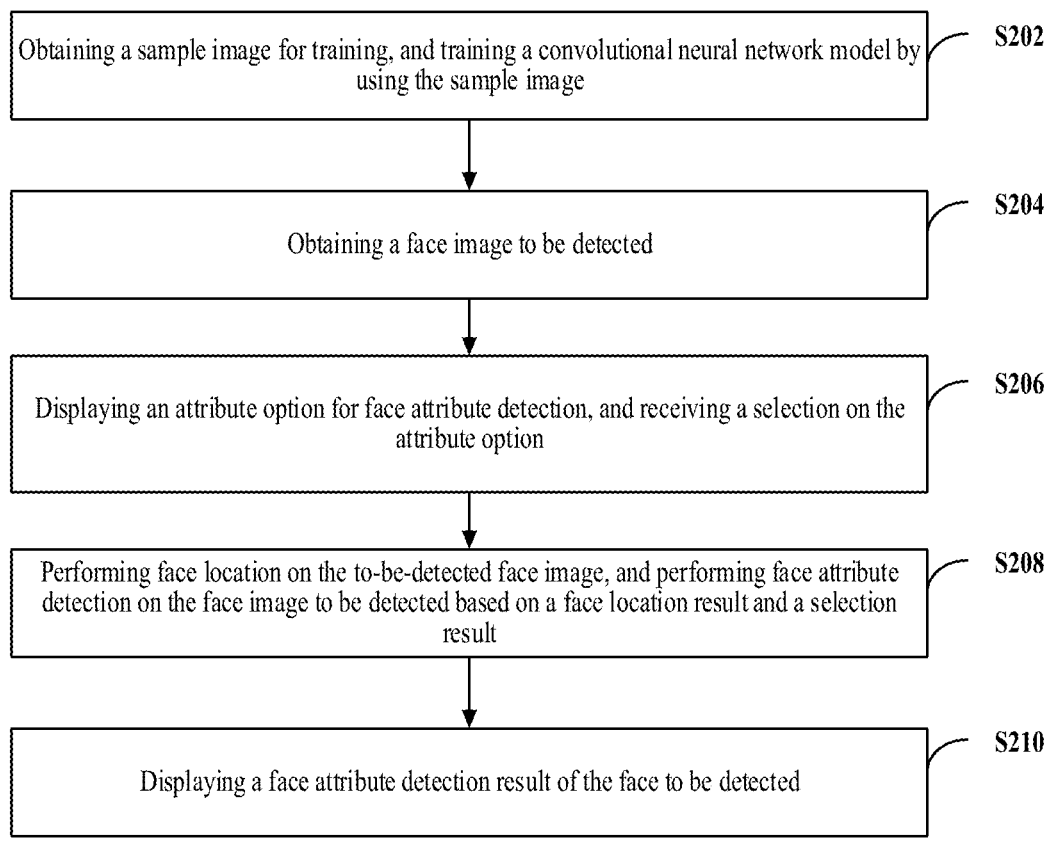
FIG. 2 is a flowchart of steps of a method for detecting a face according to another embodiment of the present disclosure.

FIG. 2 illustrates a flowchart of a method for detecting a face according to another embodiment of the present disclosure. In the present embodiment, a convolutional neural network model having a face attribute detection function is trained first, and then face attribute detection on an image is performed based on the convolutional neural network model. However, a person skilled in the art should understand that, in practical use, the face attribute detection is also performed by a convolutional neural network model trained by a third party. The method for detecting a face according to the present embodiment includes:

At S202: a sample image for training is obtained, and a convolutional neural network model is trained by using the sample image.

The sample image is a static image or is a sample image in a video frame sequence. The sample image includes any one or more of the following tagging information: race information, gender information, age information, appearance information, facial expression information, facial movement information, or facial attachment information. The facial movement detection includes, but is not limited to, any one or more of: eye-closing detection, mouth-opening detection, or the like; the facial attachment detection includes, but is not limited to, one or more of: detection for detection of whether there are beards, detection of whether a mask is worn, detection of whether a pair of glasses is worn, detection for the type of the glasses, or the like; the expression attribute detection includes detecting any one or more of the following expressions: anger, fear, sadness, calmness, happiness, disgust, surprise, rage, confusion, pleasure, squint, scream, or the like; appearance detection includes, but is not limited to, any one or more of: a charm value, a face value, or the like.

After the sample image is obtained and before the convolutional neural network model is trained by using the sample image, the sample image is further detected to obtain information of face key points. Then, the convolutional neural network model is trained by using the sample image and the information of the face key points. However, no limitation is made thereto. The obtaining of the face key points is further implemented by extracting the face key points by a convolution portion of the convolutional neural network model, i.e., the convolution portion first extracts the face key points in the face image to be detected, and then performs further face attribute detection and training based on the extracted face key points, i.e., the sample image is detected by means of the convolutional neural network model to obtain the information of the face key points; the convolutional neural network model is trained by using the sample image, the information of the face key points, and the tagging information. Certainly, before input into the convolutional neural network model, the face key points in the sample image are artificially tagged to obtain the information of the face key points.

In a feasible mode of implementing the present step, face attribute feature extraction is performed on the sample image by means of the convolution portion of the convolutional neural network model to obtain a face attribute feature map; a Region of Interest (ROI) respectively corresponding to at least one face key point in the face attribute feature map is determined; pooling processing is performed on each determined ROI by means of a pooling portion of the convolutional neural network model to obtain a pooled ROI feature map; and network parameters of the convolutional neural network model are adjusted according to the ROI feature map.

In a feasible mode, determining an ROI respectively corresponding to at least one face key point in the face attribute feature map includes: determining, in the face attribute feature map, at least one corresponding position according to coordinates of the at least one face key point; and using the at least one determined position as a reference point to obtain at least one corresponding region within a set range, and determining the at least one obtained region as the corresponding ROI. For example, in the face attribute feature map, the corresponding position is determined according to the coordinates of the face key points; and the determined position is used as a center to obtain a region within a set range, and the obtained region is determined as the ROI. By taking as an example a case where the face key points are 21 key points (the 21 key points respectively include: three key points (the inner end of an eyebrow, the outer end of the eyebrow, and the top of the eyebrow) at the eyebrow at each side), three key points (an inner canthus, an outer canthus, and a pupil center) at the eye at each side, four key points (the outermost points of wings of the nose, the tip of the nose, and the undermost point of the end of the nose) at the nose, and five key points (two corners of the mouth, the pit of the upper lip, the pit of the lower lip, and the middle position of the contact line of the lower lip and the upper lip) at the mouth, when the ROI is determined, according to the coordinates of the face key points, i.e., the 21 key points, first the face key points are mapped back to the face attribute feature map output by the last convolution layer of the Convolutional Neural Network (CNN) model, then each key point on the face attribute feature map is used as the center, a region within a certain range is cut (in general, the cut range is 3×3 to 7×7, for example, 3×3), and the feature map of the 21 regions is as an input of the ROI pooling layer. The 21 regions cover all positions related to face attributes (such as expressions and movements), and there is no redundant information, so that a CNN can concentrate more on learning these regions.

In the CNN, the pooling layer is often subsequent to the convolution layer, the feature vector output by the convolution layer is reduced by means of pooling, and the result is improved, such that overfitting would not easily occur in the result. For different images, the size of a pooling window and a step size are dynamically calculated according to the size of the image, so as to obtain pooling results of images having the same size. In the embodiments of the present disclosure, the ROI is input to the pooling layer, and by means of the ROI pooling processing of the pooling layer, a feature representation of the ROI having a fixed length can be obtained, i.e., ROI feature maps having a uniform size.

In one optional example, when the network parameters of the convolutional neural network model are adjusted according to the ROI feature map, the pooled ROI feature map having a set size is input into a full connection layer and a loss layer to obtain an attribute classification result error obtained by performing attribute classification on the sample image; and the network parameters of the convolutional neural network model are adjusted according to the attribute classification result error. In another optional example, when the network parameters of the convolutional neural network model are adjusted according to the ROI feature map, the pooled ROI feature map having the set size is input into the full connection layer and the loss layer to obtain an expression classification result error obtained by performing expression classification on the sample image; and the network parameters of the convolutional neural network model are adjusted according to the expression classification result error. The adjusted network parameters include, but are not limited to, a weight parameter, a bias parameter, or the like.

The obtaining of the attribute classification result error is implemented by inputting the ROI feature map having the set size into the loss layer, calculating the attribute classification result error by means of a logistic regression loss function of the loss layer, and outputting the attribute classification result error. The logistic regression loss function is a logistic regression loss function having a set attribute classification number.

In the present embodiment, the brief structure example of a CNN is as follows:

```
//Part I
Data input layer
//Part II
<= 1 Convolution layer 1_1 (3x3x4/2)
<= 2 Nonlinear response ReLU layer
```

-continued

```
<= 3 Pooling layer //Common pooling layer
<= 4 Convolution layer 1_2 (3x3x6/2)
<=5 Nonlinear response ReLU layer
<=6 Pooling layer
<=7 Convolution layer 1_3 (3x3x6)
<=8 Nonlinear response ReLU layer
<=9 Pooling layer
<=10 Convolution layer (2_1 (3x3x12/2)
<=11 Nonlinear response ReLU layer
<=12 Pooling layer
<=13 Convolution layer (2_2 (3x3x12)
<=14 Nonlinear response ReLU layer
<=15 Pooling layer
<=16 Nonlinear response ReLU layer
<=17 Convolution layer 5_4 (3x3x16)
//Part III
<=18 ROI pooling layer //Pooling layer performing ROI pooling
<=19 Full connection layer
<=20 Loss layer
```

In the CNN structure, the tagged face sample image and face key points are input to the CNN by means of the input layer of part I for training; then processing is performed by means of the conventional convolution portion of part II; after ROI processing is performed on the processing result in part II according to the face key points, the obtained ROI feature map is input to the ROI pooling layer for ROI pooling processing; the ROI subjected to the ROI pooling processing is sequentially input to the full connection layer and the loss layer; and how to adjust training parameters of the CNN is determined according to the processing result of the loss layer, and the CNN is trained.

When the ROI processing is performed on the processing result in part II according to face key points, for ROIs corresponding to the face key points, first the ROIs are mapped back to the last convolution layer (in the present embodiment, the convolution layer is the 18th layer) of the CNN according to the coordinates of the face key points, the key points are used as the centers, multiple small regions (such as a 3×3 region) corresponding to the number of the face key points are cut from feature maps, then the feature maps of these regions are used as inputs of the ROI pooling layer to obtain feature maps, and the feature maps are input to the full connection layer, and then input to a logistic regression loss function layer (such as SoftmaxWithloss Layer), calculation is performed on the basis of the result and tagged face attributes to obtain errors, and back propagation of the errors is performed, so as to update the parameters of the CNN, including parameters of the full connection layer. The process is repeated in this way until a set number of iterative trainings are achieved, or the errors are not reduced any longer, the CNN converges, so as to obtain a trained CNN.

The ROI pooling layer is a pooling layer for the ROI feature map. For example, if the coordinates of a certain ROI are ((x1, y1, x2, y2), the output size is (y2−y1)×(x2−x1); if the output size of the ROI pooling layer is pooled_height× pooled_width, the output of each grid is the region pooling result of [(y2−y1)/pooled_height]×[(x2−x1)/pooled_width]. pooled_height is a height, and pooled_width is a width.

In addition, it should be noted that:

in the description of the convolutional network structure, 2.<=1 indicates that the current layer is the second layer and the input is the first layer; the parentheses subsequent to the convolution layer are parameters of the convolution layer, (3×3×16) indicates that the size of a convolution kernel is 3×3 and the number of channels is 16. By analogy, details are not described again.

In the convolutional network structure, there is a nonlinear response unit (ReLU) subsequent to each convolution layer. According to one or more embodiments of the present disclosure, a Parametric Rectified Linear Unit (PReLU) is used as the ReLU so as to effectively improve the detection precision.

In addition, by setting the size of the convolution kernel of the convolution layer to be 3×3, local information is better integrated; by setting the stride of convolution layers, a larger field of view can be obtained without increasing the calculation quantity of the upper-layer features.

However, a person skilled in the art should understand that: the size of the convolution kernel, the number of the channels, and the number of the convolution layers are all illustratively described. In practical applications, a person skilled in the art may perform adaptive adjustments according to actual requirements. No limitation is made thereto in the embodiments of the present disclosure. In addition, the combinations and parameters of all the layers in the convolutional network in this embodiment are optional, and the layers are combined arbitrarily.

The aforementioned trained CNN is trained in a more targeted manner by selecting the regions corresponding to the face key points as the ROIs, and the face attributes are recognized more accurately by fully utilizing detail information of multiple regions of a face.

By means of the process above, the training of the convolutional neural network model having an attribute detection function is implemented, and face attribute detection is performed accordingly based on the trained convolutional neural network model.

In an optional example, the operation in S202 is performed by a processor by invoking a corresponding instruction stored in a memory, or is performed by a training module 314 run by the processor.

At S204: a face image to be detected is obtained.

The face image to be detected is any static face image or face image in a video frame sequence or the like.

In a feasible mode, a camera is turned on to capture a face image, and the captured face image is used as the face image to be detected. The face images captured by the camera are mostly real images of a person related to a terminal user, such as a photographer or a person photographed by the photographer; by using the captured face image as the face image to be detected, better interaction with the user is achieved, user requirements are satisfied, and detecting a face becomes more interesting and realistic to the user.

In an optional example, the operation in S204 is performed by a processor by invoking a corresponding instruction stored in a memory, or is performed by a camera run by the processor.

At S206: an attribute option for the face attribute detection is displayed, and a selection on the attribute option is received.

The attribute option for the face attribute detection includes an option for basic attribute detection and/or expression attribute detection. The option for basic attribute detection for example includes, but is not limited to, gender detection and race detection. In addition, the option for basic attribute detection further includes any one or more of: age detection, appearance detection, facial movement detection, or facial attachment detection. The facial movement detection for example includes, but is not limited to: eye-closing detection, mouth-opening detection, or the like; the facial attachment detection includes any one or more of: detection for detection of whether there are beards, detection of whether a mask is worn, detection of whether a pair of glasses is worn, detection for the type of the glasses, or the like. Moreover, the expression attribute detection for example includes detecting any one or more of the following expressions: anger, fear, sadness, calmness, happiness, disgust, surprise, rage, confusion, pleasure, squint, scream, or the like; the appearance detection for example includes, but is not limited to, any one or more of: a charm value, a face value, or the like. By means of the attribute detection above, information of a detected face can be reflected from different angles and aspects.

An attribute option for the face attribute detection is as shown in FIG. 3. In FIG. 3, basic attributes include several of: gender, race, age, mask, glasses, face value, close eye, open mouth, beards, and select all. The gender and race are required, and other items are all optional. If "Select All" is selected, all the items are selected. In the options, by means of the option "face value," the appearance detection for a face image is performed, by means of options "Close Eye" and "Open Mouth," the facial movement detection for the face image is performed, and by means of options "mask," "glasses," and "beards," the facial attachment detection for the face image is performed. In FIG. 3, expression attributes include: anger, happiness, fear, disgust, sadness, surprise, calmness, and select all. If "Select All" is selected, all the items are selected. Except for the option "Select All," each of the other items corresponds to one expression attribute detection. If a certain option is selected, the corresponding expression attribute detection for the face image is performed. In addition, a corresponding icon is provided for each attribute. In this case, the detection result is displayed in the form of a corresponding icon instead of a textual form, thereby making attribute display more interesting and beautiful.

It should be noted that, FIG. 3 only involves exemplary description. A person skilled in the art may use other appropriate attribute option implementation solutions according to actual requirements. No limitation is made thereto in the embodiments of the present disclosure.

In addition, in a feasible solution, displaying before the attribute option for face attribute detection, the method according to the present embodiment includes displaying a language selection option (such as option "Change Language" in FIG. 3), receiving a selection operation on the language selection option, and determining a display language according to the selection operation; the displaying an attribute option for the face attribute detection includes: displaying the attribute option for the face attribute detection by using the determined display language. By means of the language selection option, texts in an application are displayed by using different languages, thereby facilitating using different languages by the user.

In addition, it should further be noted that, in practical applications, it is also possible to directly set the detection and display of the corresponding face attributes without the need for the terminal user to set and select. Moreover, when the attribute option for the face attribute detection is displayed, attribute items of interest to the user are selected. On one hand, data processing burden for the face attribute detection can be reduced, thereby improving face attribute detection efficiency; on the other hand, use experience of the user is further improved.

In an optional example, the operation in S206 is performed by a processor by invoking a corresponding instruction stored in a memory, or is performed by a detection module 304 run by the processor.

At S208, face location is performed on the face image to be detected, and face attribute detection is performed on the face image to be detected based on a face location result and the selection result.

In the present embodiment, the face location result for example includes, but is not limited to: a face position and/or face key points in the face image.

In a feasible mode, face attribute feature extraction is performed on the face image to be detected at least by means of the convolution portion of the trained CNN to obtain a face attribute feature map, for example, according to the face position and/or the face key points in the face image, face attribute feature extraction is performed on the face image by means of a convolution layer portion of the convolutional neural network model to obtain a face attribute feature map; an ROI respectively corresponding to at least one face key point in the face attribute feature map; pooling processing is performed on the at least one determined ROI at least by means of a pooling portion of the CNN to obtain a pooled ROI feature map; and a face attribute detection result is obtained at least according to the ROI feature map.

After the ROI feature map is obtained, face attribute detection is performed according to the ROI feature map.

In an optional solution, when consecutive face images in the video frame sequence are detected by using the CNN, if a current frame is used as the reference, the current frame in the video frame sequence is detected first by using the CNN, and a preliminary attribute detection result of the face image of the current frame is obtained according to an ROI feature map of the face image of the current frame; and then an attribute detection result of a face image of the current frame is obtained according to the preliminary attribute detection result of the current frame and an attribute detection result of a face image of at least one previous frame. For example, after the preliminary face attribute detection result of the current frame is obtained, whether the position of the current frame in the video frame sequence is greater than or equal to a set position threshold; if not, because the position of the current frame in the video frame sequence is less than the set position threshold, the face attribute detection result of the current frame is used as a final face attribute detection result of the face image of the current frame, and/or the face attribute detection result of the face image of the current frame is saved; if yes, face attribute detection results of a set number of video frames previous to the current frame are obtained; and linear weighting processing is performed on the preliminary attribute detection result of the face image of the current frame and the obtained face attribute detection result of the face image of the at least one previous frame to obtain the attribute detection result of the face image of the current frame. The at least one previous frame are one or more consecutive frames previous to the current frame, or are one or more inconsecutive frames previous to the current frame. By means of the process above, the attribute detection result of the current frame is determined according to detection results of the multiple consecutive frames, thereby avoiding single-frame detection errors, and making the detection result more precise.

When the linear weighting processing is performed on the face attribute detection result of the current frame and the obtained face attribute detection result of the at least one previous frame, weights are set respectively for the preliminary face attribute detection result of the current frame and the obtained face attribute detection result of the previous frame, and when the weights are set, for example, the weight of the preliminary face attribute detection result of the current frame is set to be greater than that of the face attribute detection result of any one of the previous frames; and then linear weighting is performed on the preliminary face attribute detection result of the current video frame and the obtained face attribute detection result of the previous frame according to the set weights. Attribute detection is mainly performed on the current video frame, and therefore, when a relatively large weight is set for the detection result of the current video frame and the detection result of an associated video frame is used as the reference, it can be effectively ensured that the current video frame is used as a detection target.

It should be noted that, during the process above, the set position threshold, the set number of the video frames previous to the current frame, and the set weights may all be appropriately set by a person skilled in the art according to actual situations. According to one or more embodiments of the present disclosure, the set number of the video frames previous to the current video frame is 3.

By means of the present embodiment, minutely changing facial expressions can be captured by using the convolutional neural network model capable of precisely detecting face attributes, thereby making attribute detection more precise and quicker. Moreover, for a sequence of consecutive video frames, by means of fusion of detection results of the multiple consecutive frames, single-frame detection errors are effectively avoided, and attribute detection precision is also further improved.

In an optional example, step S208 is performed by a processor by invoking a corresponding instruction stored in a memory, or is performed by a detection module 304 run by the processor.

Step S210: a face attribute detection result of the face image to be detected is displayed.

In an optional mode, after the face attribute detection is performed, face attribute display information corresponding to the face attribute detection result is determined; and the face attribute display information is displayed.

The face attribute display information for example includes, but is not limited to, any one or more of: face attribute description text information, face attribute description icon information, face attribute description animation information, face attribute description voice information, or a sticker corresponding to the face attribute detection result. The sticker uses an Augmented Reality (AR) special effect in any form, for example including, but not limited to, a two-dimensional sticker effect, a three-dimensional effect, a particle effect, or the like. For example, if the face attribute detection result is an expression "happiness," the sticker corresponding to the expression "happiness" is any content of a theme "happiness," such as a decoration "happy Santa Claus," or the like.

In addition, the position and/or face key points are marked in the face image based on the face location result while the face attribute display information is displayed.

Furthermore, based on the foregoing embodiment, after the face attribute display information is displayed, the face image to be detected and the face attribute display information are synthesized to obtain a synthetic image. Then, the synthetic image is stored; and/or the synthetic image is sent to a target address.

However, no limitation is made thereto. A person skilled in the art may further perform, based on the displayed information, any appropriate operation, for example, displaying, according to the face attribute detection result, service information related to the face attribute detection result, such as advertisement information, news information, or the like. The service information may further be implemented by a person skilled in the art in any appropriate form, and for example includes, but is not limited to, an AR special effect, or a common picture or text, or the like.

Figure 4:
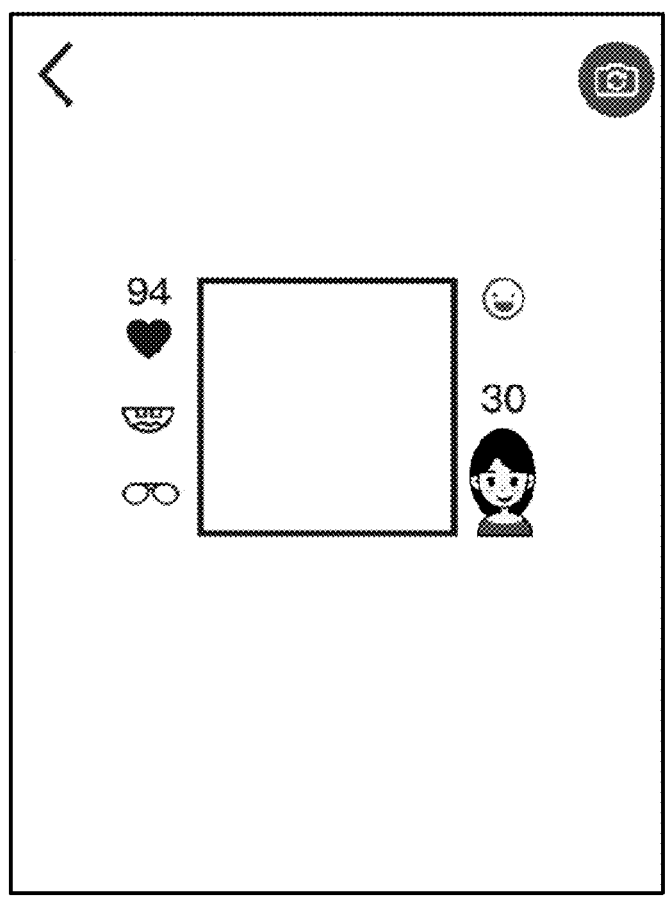
FIG. 4 is a schematic diagram of face tagging and face attribute detection result display in the embodiment shown in FIG. 2.

A schematic diagram for displaying a face location result and a face attribute detection result is as shown in FIG. 4. In FIG. 4, a block is tagging of the face location result. At the left side of the block, a heart-shaped icon corresponding to a face value and a face value score "94" above the heart-shaped icon, an icon corresponding to a facial movement "mouth opening," and an icon for glasses wearing are separately displayed; at the right side of the block, an icon corresponding to "happiness," a number corresponding to an age, and an icon for a detection result displayed by using a cartoon after detection is performed on the gender, the race, whether a mask is worn, etc. are separately displayed.

By means of the face location, the face attribute detection, and the display of the location and detection results, various attributes of the face image are obtained and displayed.

In an optional example, step S210 is performed by a processor by invoking a corresponding instruction stored in a memory, or is performed by a display module 306 run by the processor.

By means of the present embodiment, on the basis of performing face location on the face image to be detected, face attribute detection is further performed, where the face attribute detection includes basic attribute detection and/or expression attribute detection. By means of the face attribute detection, various attribute information in the face image to be detected can be obtained, so as to satisfy diversified requirements of a user for obtaining corresponding face information in the face image from different angles; the face attribute detection result is displayed to the user, so that the user can learn the detection result more clearly, and use experience of face image detection can be improved while the requirements are satisfied.

The method for detecting a face according to the present embodiment is executed by any appropriate device having data processing capability, for example, including, but not limited to, a mobile terminal, a Personal Computer (PC), a server, a vehicle-mounted device, an entertainment device, an advertisement device, or the like.

Any method for detecting a face provided in the embodiments of the present disclosure may be executed by any appropriate device having data processing capability, including, but not limited to, a terminal device and a server, etc. Alternatively, any method for detecting a face provided in the embodiments of the present disclosure is executed by a processor, for example, any method for detecting a face mentioned in the embodiments of the present disclosure is executed by the processor by invoking a corresponding instruction stored in a memory. Details are not described below again.

A person of ordinary skill in the art may understand that all or some steps of implementing the forgoing embodiments of the method may be achieved by a program by instructing related hardware; the program can be stored in a computer-readable storage medium; when the program is executed, steps including the foregoing embodiments of the method are executed. Moreover, the forgoing storage medium includes at least one medium capable of storing a program code, such as an ROM, an RAM, a magnetic disk, or an optical disk.

Figure 5:
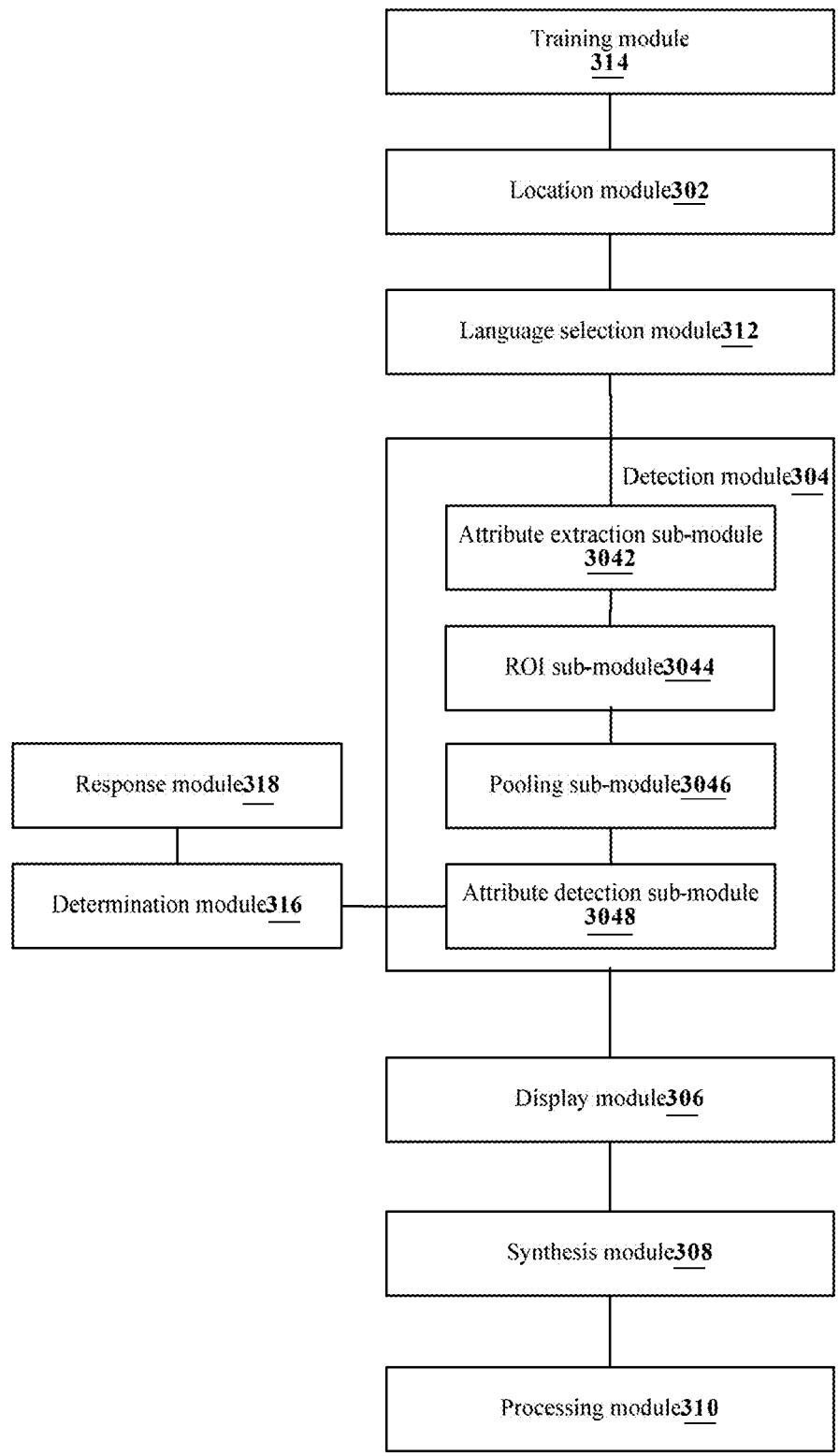
FIG. 5 is a structural block diagram of an apparatus for detecting a face according to one embodiment of the present disclosure.

FIG. 5 illustrates a structural block diagram of an apparatus for detecting a face according to one embodiment of the present disclosure. The apparatus for detecting a face according to the present embodiment includes: a location module 302 configured to perform face location on a face image to be detected; a detection module 304 configured to perform face attribute detection on the face image based on a face location result of the face image to be detected; and a display module 306 configured to display a face attribute detection result.

According to one or more embodiments of the present disclosure, the face location result includes: a face position and/or face key points in the face image; the display module 306 is further configured to mark the face position and/or the face key points in the face image based on the face location result.

According to one or more embodiments of the present disclosure, the face attribute detection for example includes, but is not limited to, any one or more of: gender detection, race detection, age detection, appearance detection, facial movement detection, facial attachment detection, or expression attribute detection.

According to one or more embodiments of the present disclosure, the facial movement detection for example includes, but is not limited to, any one or more of: eye-closing detection or mouth-opening detection; and/or the facial attachment detection for example includes, but is not limited to, any one or more of: detection for detection of whether there are beards, detection of whether a mask is worn, detection of whether a pair of glasses is worn, or detection for the type of the glasses; and/or the expression attribute detection for example includes detecting, but is not limited to, one or more of the following expressions: anger, fear, sadness, calmness, happiness, disgust, or surprise.

According to one or more embodiments of the present disclosure, the display module 306 is configured to determine face attribute display information corresponding to the face attribute detection result, and to display the face attribute display information.

According to one or more embodiments of the present disclosure, the face attribute display information for example includes, but is not limited to, any one or more of: face attribute description text information, face attribute description icon information, face attribute description animation information, face attribute description voice information, or a sticker corresponding to the face attribute detection result.

According to one or more embodiments of the present disclosure, the apparatus for detecting a face according to the present embodiment further includes: a synthesis module 308 configured to synthesize, after the display module 306 displays the face attribute display information, the face image to be detected and the face attribute display information to obtain a synthetic image.

According to one or more embodiments of the present disclosure, the apparatus for detecting a face according to the present embodiment further includes: a processing module 310 configured, after the synthesis module 308 obtains a synthetic image, to store the synthetic image, and/or to send the synthetic image to a target address.

According to one or more embodiments of the present disclosure, the display module 306 is further configured to display, according to the face attribute detection result, service information related to the face attribute detection result.

According to one or more embodiments of the present disclosure, the detection module 304 is configured to display an attribute option for the face attribute detection, and to receive a selection operation on the attribute option; and to perform the face attribute detection on the face image to be detected according to a selection operation result and the face location result.

According to one or more embodiments of the present disclosure, the apparatus for detecting a face according to the present embodiment further includes: a language selection module 312 configured, before the detection module 304 displays an attribute option for the face attribute detection, to display a language selection option, to receive a selection on the language selection option, and to determine a display language according to the selection; the detection module 304 is configured to display the attribute option for the face attribute detection by using the determined display language, and to receive a selection on the attribute option; and to perform the face attribute detection on the face image to be detected according to a selection result and the face location result.

According to one or more embodiments of the present disclosure, the detection module 304 includes: an attribute extraction sub-module 3042 configured to perform, through a convolution portion of a convolutional neural network model, face attribute feature extraction on the face image to obtain a face attribute feature map, for example, according to the face position and/or the face key points in the face image, face attribute feature extraction is performed on the face image through a convolution layer portion of the convolutional neural network model to obtain a face attribute feature map; an ROI sub-module 3044 configured to determine an ROI respectively corresponding to at least one face key point in the face attribute feature map; a pooling sub-module 3046 configured to perform pooling processing on each determined ROI by means of a pooling portion of the convolutional neural network model to obtain a pooled ROI feature map; and an attribute detection sub-module 3048 configured to obtain a face attribute detection result according to the ROI feature map.

According to one or more embodiments of the present disclosure, the face image includes a static face image.

According to one or more embodiments of the present disclosure, the face image includes a face image in a video frame sequence.

According to one or more embodiments of the present disclosure, the attribute detection sub-module 3042 is configured to obtain a preliminary face attribute detection result of an image of a current frame according to the ROI feature map of the image of the current frame in the video frame sequence; and to obtain a face attribute detection result of the current frame according to the preliminary face attribute detection result of the image of the current frame and a face attribute detection result of an image of at least one previous frame.

According to one or more embodiments of the present disclosure, the attribute detection sub-module is configured, when obtaining a face attribute detection result of the current frame according to the preliminary face attribute detection result of the image of the current frame and a face attribute detection result of the image of the at least one previous frame, to: perform weighting processing on the preliminary face attribute detection result of the image of the current frame and the face attribute detection result of the image of the at least one previous frame to obtain the face attribute detection result of the image of the current frame, where the weight of the preliminary face attribute detection result of the image of the current frame is greater than that of the face attribute detection result of any one of the images of the previous frames.

According to one or more embodiments of the present disclosure, the apparatus for detecting a face according to the present embodiment further includes: a determination module 316 configured to determine that the position of the image of the current frame in the video frame sequence is greater than or equal to a set position threshold.

According to one or more embodiments of the present disclosure, the apparatus for detecting a face according to the present embodiment further includes: a response module 318 configured, in response to the position of the image of the current frame in the video frame sequence being less than the set position threshold, to output the face attribute detection result of the image of the current frame, and/or to save the face attribute detection result of the image of the current frame.

According to one or more embodiments of the present disclosure, the apparatus for detecting a face according to the present embodiment further includes: a training module 314 configured, before the attribute extraction sub-module 3042 performs face attribute feature extraction on the face image by means of a convolution portion of a convolutional neural network model, to obtain a sample image for training, and to train the convolutional neural network model by using the sample image, where the sample image includes any one or more of the following tagging information: race information, gender information, age information, appearance information, facial expression information, facial movement information, or facial attachment information.

According to one or more embodiments of the present disclosure, the training module 314 is configured to obtain a sample image for training, and to detect the sample image for training to obtain information of face key points; and to train the convolutional neural network model by using the sample image and the information of the face key points.

According to one or more embodiments of the present disclosure, the training module 314 is configured, when training the convolutional neural network model by using the sample image, to: detect the sample image by means of the convolutional neural network model to obtain information of face key points; and train the convolutional neural network model by using the sample image, the information of the face key points, and the tagging information.

According to one or more embodiments of the present disclosure, the training module 314 is configured, when training the convolutional neural network model by using the sample image, to: perform, through a convolution portion of the convolutional neural network model, face attribute feature extraction on the sample image to obtain a face attribute feature map; determine an ROI respectively corresponding to at least one face key point in the face attribute feature map; perform pooling processing on each determined ROI by means of a pooling portion of the convolutional neural network model to obtain a pooled ROI feature map; and adjust network parameters of the convolutional neural network model at least according to the ROI feature map.

According to one or more embodiments of the present disclosure, the training module 314 is configured to: when determining an ROI corresponding to each of the at least one face key point in the face attribute feature map, determine, in the face attribute feature map, at least one position of the at least one face key point according to coordinates of the at least one face key point; and use the at least one determined position as a reference point to obtain at least one region within a set range, and determine the at least one obtained region as the corresponding ROI.

According to one or more embodiments of the present disclosure, the training module 314 is configured to perform poling processing on each determined ROI by means of the pooling portion of the convolutional neural network model to obtain a pooled ROI feature map having a set size; to input the ROI feature map having the set size into a loss layer to obtain an expression classification result error obtained by performing expression classification on the sample image; and to adjust the network parameters of the convolutional neural network model according to the expression classification result error.

The apparatus for detecting a face according to the present embodiment is configured to implement the corresponding method for detecting a face in the multiple foregoing method embodiments, and has beneficial effects of the corresponding method embodiments.

In addition, embodiments of the present disclosure further provide an electronic device, including: a processor and a memory;

where the memory is configured to store at least one executable instruction, and the executable instruction enables the processor to execute the method for detecting a face according to any one of the embodiments of the present disclosure.

Figure 6:
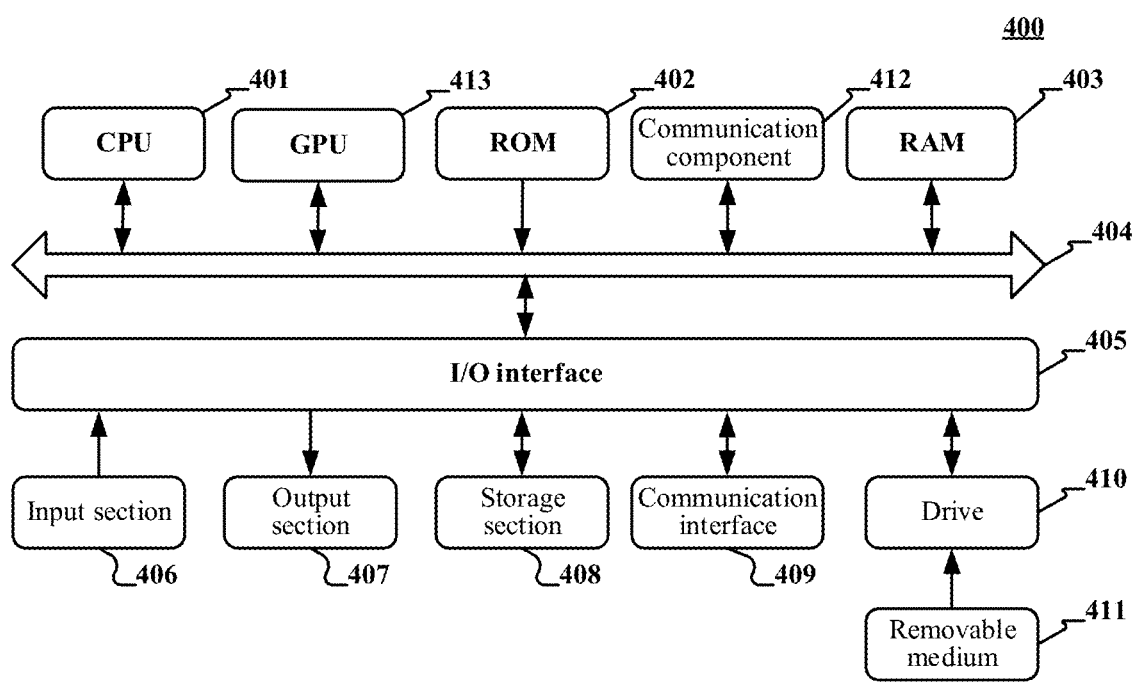
FIG. 6 is a schematic structural diagram of an application embodiment of an electronic device according to the embodiments of the present disclosure.

In addition, the embodiments of the present disclosure further provide another electronic device, including:

a processor and the apparatus for detecting a face according to any one of the embodiments of the present disclosure;

where when the apparatus for detecting a face is run by the processor, the apparatus for detecting a face according to any one of the embodiments of the present disclosure is run. The embodiments of the present disclosure provide an electronic device, which, for example, is a mobile terminal, a Personal Computer (PC), a tablet computer, a server, or the like. Referring to FIG. 6 below, FIG. 6 is a schematic structural diagram of an application embodiment of an electronic device 400 suitable for implementing a terminal device or a server according to the embodiments of the present disclosure. As shown in FIG. 6, the electronic device 400 includes one or more processors, a communication element, and the like. The one or more processors are, for example, one or more Central Processing Units (CPUs) 401, and/or one or more Graphics Processing Units (GPUs) 413, and the like. The processors execute at least one appropriate action and processing according to an executable instruction stored in a Read-Only Memory (ROM) 402 or an executable instruction loaded from a storage section 408 to a Random Access Memory (RAM) 403. The communication element includes a communication component 412 and/or a communication interface 409. The communication component 412 may include, but is not limited to, a network card. The network card may include, but is not limited to, an InfiniBand (IB) network card. The communication interface 409 includes a communication interface of a network interface card including an LAN card, a modem and the like, and the communication interface 409 performs communication processing via a network such as the Internet.

The processor may communicate with the ROM 402 and/or the RAM 403, to execute executable instructions. The processor is connected to the communication component 412 via a bus 404, and communicates with other target devices via the communication component 412, thereby implementing corresponding operations of any method for detecting a face provided in the embodiments of the present disclosure. For example, face location is performed on a face image to be detected; face attribute detection is performed on the face image based on a face location result; and a face attribute detection result is displayed.

In addition, the RAM 403 may further store at least one program and data required for operations of an apparatus. The CPU 401 or GPU 413, the ROM 402, and the RAM 403 are connected to each other by means of the communication bus 404. In the presence of the RAM 403, the ROM 402 is an optional module. The RAM 403 stores executable instructions, or writes the executable instructions to the ROM 402 during running, where the executable instructions enable the processor to perform corresponding operations of the foregoing communication method. An Input/output (I/O) interface 405 is also connected to the communication bus 404. The communication component 412 may be integrated, or may be configured to have a plurality of sub-modules (for example, a plurality of IB network cards) linked on the communication bus.

The following components are connected to the I/O interface 405: an input section 406 including a keyboard, a mouse and the like; an output section 407 including a Cathode-Ray Tube (CRT), a Liquid Crystal Display (LCD), a loudspeaker and the like; a storage section 408 including hardware and the like; and the communication interface 409 of a network interface card including an LAN card, a modem and the like. A drive 410 is also connected to the I/O interface 405 according to requirements A removable medium 411, such as a magnetic disk, an optical disk, a magneto-optical disk, and a semiconductor memory, is mounted on the drive 410 according to requirements, so that a computer program read from the removable medium 411 is installed on the storage section 408 according to requirements.

It should be noted that, the architecture shown in FIG. 6 is merely an optional implementation. During specific practice, the number and types of the components in FIG. 6 may be selected, decreased, increased, or replaced according to actual requirements. Different functional components may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present disclosure.

Particularly, a process described above with reference to a flowchart according to the embodiments of the present disclosure may be implemented as a computer software program. For example, the embodiments of present disclosure include a computer program product. The computer program product includes a computer program tangibly included in a machine-readable medium. The computer program includes a program code for performing a method shown in the flowchart. The program code may include instructions for correspondingly performing steps of the method provided in any one of the embodiments of the present disclosure. For example, the program may include instructions for correspondingly performing the following steps provided in the embodiments of the present disclosure: for example, face location is performed on a face image to be detected; face attribute detection is performed on the face image based on a face location result; and a face attribute detection result is displayed. In such embodiments, the computer program may be downloaded from a network by means of the communication element and installed, and/or installed from the removable medium 411. When the computer program is executed by the processor, the functions defined in the method according to the embodiments of the present disclosure are executed.

In addition, the embodiments of the present disclosure further provide a computer program, including a computer-readable code, where when the computer-readable code runs in a device, a processor in the device executes instructions for implementing the steps of the method for detecting a face according to any one of the embodiments of the present disclosure.

In addition, the embodiments of the present disclosure further provide a computer-readable storage medium configured to store computer-readable instructions, where when the instructions are executed, operations in the steps of the method for detecting a face according to any one of the embodiments of the present disclosure are implemented.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

It should be noted that according to requirements for implementation, the at least one component/step described in the embodiments of the present disclosure may be divided into more components/steps, or two or more components/steps or some operations of the components/steps may also be combined into a new component/step to achieve the purpose of the embodiments of the present disclosure. For the term "and/or" throughout the present disclosure, the symbol "/" refers to "or," for example, "A and/or B" including "A," "B," and "A and B."

The foregoing method according to the embodiments of the present disclosure may be implemented in hardware or firmware, or may be implemented as software or a computer code that can be stored in a recording medium (such as a CD ROM, a RAM, a floppy disk, a hard disk or a magneto-optical disk), or may be implemented as a computer code that is downloaded by means of a network, is originally stored in a remote recording medium or a non-transitory machine-readable medium, and will be stored in a local recording medium. Therefore, the method described herein may be processed by using software that is stored in a recording medium that uses a general-purpose computer, a special-purpose processor, or programmable or dedicated hardware (such as an ASIC or an FPGA). It may be understood that a computer, a processor, a microprocessor controller or programmable hardware includes a storage component (for example, a RAM, a ROM, or a flash memory) that can store or receive software or a computer code. When the software or the computer code is accessed and executed by the computer, the processor or the hardware, the processing method described herein is implemented. In addition, when the general-purpose computer accesses a code that is used for implementing processing shown herein, execution of the code converts the general-purpose computer to a special-purpose computer configured to execute the processing shown herein.

A person of ordinary skill in the art may be aware that, in combination with the at least one example described in the embodiments disclosed in the specification, units and steps of a method may be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that this implementation goes beyond the scope of the embodiments of the present disclosure.

The implementations above are merely intended to describe the embodiments of the present disclosure rather than limit the embodiments of the present disclosure. A person of ordinary skill in the art may make modifications and variations without departing from the spirit and scope of the embodiments of the present disclosure. Therefore, all equivalent technical solutions shall also fall within the scope of the embodiments of the present disclosure, and the patent protection scope of the embodiments of the present disclosure shall be subject to the claims.

The invention claimed is:

1. A computer implemented method for detecting a face, comprising:
   performing face location on a face image to be detected;
   performing face attribute detection on the face image to be detected based on a face location result, wherein the face location result comprises face key points in the face image; and
   displaying a face attribute detection result of the face image to be detected,
   wherein the face image comprises a face image in a video frame sequence, and performing the face attribute detection on the face image to be detected based on the face location result comprises:
   performing, through a convolution portion of a convolutional neural network model, face attribute feature extraction on the face image to obtain a face attribute feature map;
   determining, in the face attribute feature map, a Region of Interest (ROI) corresponding to each of at least one face key point;
   performing, through a pooling portion of the convolutional neural network model, pooling processing on each determined ROI to obtain a pooled ROI feature map; and
   obtaining a preliminary face attribute detection result of an image of a current frame according to the ROI feature map of the image of the current frame in the video frame sequence; and
   obtaining a face attribute detection result of the current frame according to the preliminary face attribute detection result of the image of the current frame and a face attribute detection result of an image of at least one previous frame, wherein the at least one previous frame is one or more consecutive frames previous to the current frame,
   wherein before the performing, through the convolution portion of the convolutional neural network model, face attribute feature extraction on the face image, the method further comprises;
   obtaining a sample image for training the convolutional neural network model;
   detecting the sample image for training to obtain information of the face key points; and
   training the convolutional neural network model by using the sample image and the information of the face key points.

2. The method according to claim 1, wherein
   the face location result further comprises a face position in the face image;
   the method further comprises: marking the face position or the face key points in the face image based on the face location result.

3. The method according to claim 1, wherein the face attribute detection comprises at least one of: gender detection, race detection, age detection, appearance detection, facial movement detection, facial attachment detection, or expression attribute detection;
   wherein the facial movement detection comprises at least one of: eye-closing detection or mouth-opening detection;
   the facial attachment detection comprises at least one of: detection for detection of whether there are beards, detection of whether a mask is worn, detection of whether a pair of glasses is worn, or detection for the type of the glasses; or
   the expression attribute detection comprises detecting wherein the following expressions: anger, fear, sadness, calmness, happiness, disgust, surprise, rage, confusion, pleasure, squint, or scream.

4. The method according to claim 1, wherein the displaying a face attribute detection result comprises:
   determining face attribute display information corresponding to the face attribute detection result; and
   displaying the face attribute display information;
   wherein the face attribute display information comprises at least one of: face attribute description text information, face attribute description icon information, face attribute description animation information, face attribute description voice information, or a sticker corresponding to the face attribute detection result.

5. The method according to claim 4, wherein after the displaying the face attribute display information, the method further comprises:
   synthesizing the face image to be detected and the face attribute display information to obtain a synthetic image; and
   displaying the synthetic image, storing the synthetic image, or sending the synthetic image.

6. The method according to claim 1, wherein after the displaying a face attribute detection result, the method further comprises:
   displaying, according to the face attribute detection result, service information related to the face attribute detection result.

7. The method according to claim 1, wherein the performing face attribute detection on the face image based on a face location result comprises:
   displaying an attribute option for the face attribute detection, and receiving a selection on the attribute option; and
   performing the face attribute detection on the face image to be detected according to a selection result and the face location result.

8. The method according to claim 7, wherein before the displaying an attribute option for the face attribute detection, the method further comprises: displaying a language selection option, receiving a selection on the language selection option, and determining a display language according to the selection on the language selection option;
   the displaying an attribute option for the face attribute detection comprising: displaying the attribute option for the face attribute detection by using the determined display language.

9. The method according to claim 1, wherein the face image further comprises a static face image.

10. The method according to claim 1, wherein the obtaining a face attribute detection result of the current frame according to the preliminary face attribute detection result of the image of the current frame and a face attribute detection result of an image of at least one previous frame comprises:
    performing weighting processing on the preliminary face attribute detection result of the image of the current frame and the face attribute detection result of the image of the at least one previous frame to obtain the face attribute detection result of the image of the current frame, wherein weight of the preliminary face attribute detection result of the image of the current frame is greater than that of the face attribute detection result of any one of the images of the previous frames.

11. The method according to claim 1, wherein before the obtaining a face attribute detection result of the current frame according to the preliminary face attribute detection result of the image of the current frame and a face attribute detection result of an image of at least one previous frame, the method further comprises:
  determining whether the position of the image of the current frame in the video frame sequence is greater than or equal to a set position threshold;
  in response to determining that the position of the image of the current frame in the video frame sequence is less than the set position threshold, performing at least one of the following: outputting the face attribute detection result of the image of the current frame, or saving the face attribute detection result of the image of the current frame.

12. The method according to claim 11, wherein the performing, through a convolution portion of a convolutional neural network model, face attribute feature extraction on the face image to obtain a face attribute feature map comprises:
  performing, according to the face position or the face key points in the face image, face attribute feature extraction on the face image through a convolution layer portion of the convolutional neural network model to obtain the face attribute feature map.

13. The method according to claim 1, wherein
  the sample image comprises at least one of the following tagging information: race information, gender information, age information, appearance information, facial expression information, facial movement information, or facial attachment information.

14. The method according to claim 13, wherein
  the detecting the sample image for training to obtain the information of the face key points; and training the convolutional neural network model by using the sample image and the information of the face key points comprises:
  detecting the sample image through the convolutional neural network model to obtain the information of the face key points; and training the convolutional neural network model by using the sample image, the information of the face key points and the tagging information.

15. The method according to claim 14, wherein the training the convolutional neural network model by using the sample image and the information of the face key points comprises:
  performing, through the convolution portion of the convolutional neural network model, face attribute feature extraction on the sample image to obtain the face attribute feature map;
  determining the ROI corresponding to each of at least one face key point in the face attribute feature map;
  performing pooling processing on each determined ROI through the pooling portion of the convolutional neural network model to obtain the pooled ROI feature map; and
  adjusting network parameters of the convolutional neural network model according to the ROI feature map.

16. The method according to claim 15, wherein the determining an ROI corresponding to each of the at least one face key point in the face attribute feature map comprises:
  determining, in the face attribute feature map, at least one position of the at least one face key point according to coordinates of the at least one face key point; and
  using the at least one determined position of the at least one face key point as reference points to obtain at least one set region of the at least one face key point, and determining the at least one region of the at least one face key point as the ROI of the at least one face key point.

17. The method according to claim 15, wherein the performing, through a pooling portion of the convolutional neural network model, pooling processing on each determined ROI to obtain a pooled ROI feature map comprises:
  performing poling processing on each determined ROI through the pooling portion of the convolutional neural network model to obtain a pooled ROI feature map having a set size;
    the adjusting network parameters of the convolutional neural network model according to the ROI feature map comprises: inputting the ROI feature map having the set size into a loss layer to obtain an expression classification result error, wherein the expression classification result error is obtained by performing expression classification on the sample image; and adjusting the network parameters of the convolutional neural network model according to the expression classification result error.

18. An apparatus for detecting a face, comprising:
  a processor; and
  a memory for storing instructions executable by the processor;
  wherein execution of the instructions by the processor causes the processor to perform the following operations, the operations comprising:
  performing face location on a face image to be detected;
  performing face attribute detection on the face image to be detected based on a face location result, wherein the face location result comprises face key points in the face image; and
  displaying a face attribute detection result of the face image to be detected,
  wherein the face image comprises a face image in a video frame sequence, and the operation of performing face attribute detection on the face image to be detected based on the face location result comprises:
  performing, through a convolution portion of a convolutional neural network model, face attribute feature extraction on the face image to obtain a face attribute feature map;
  determining, in the face attribute feature map, a Region of Interest (ROI) corresponding to each of at least one face key point;
  performing, through a pooling portion of the convolutional neural network model, pooling processing on each determined ROI to obtain a pooled ROI feature map; and
  obtaining a preliminary face attribute detection result of an image of a current frame according to the ROI feature map of the image of the current frame in the video frame sequence; and
  obtaining a face attribute detection result of the current frame according to the preliminary face attribute detection result of the image of the current frame and a face attribute detection result of an image of at least one previous frame, wherein the at least one previous frame is one or more consecutive frames previous to the current frame, wherein before the operation of performing, through the convolution portion of the convolutional neural network model, face attribute feature extraction on the face image, execution of the instructions by the processor causes the processor to further perform:

obtaining a sample image for training the convolutional neural network model;

detecting the sample image for training to obtain information of the face key points; and training the convolutional neural network model by using the sample image and the information of the face key points.

19. A non-transitory computer-readable storage medium, having computer-readable instructions stored thereon, wherein execution of the computer-readable instructions by a processor causes the processor to implement:

performing face location on a face image to be detected;

performing face attribute detection on the face image to be detected based on a face location result, wherein the face location result comprises face key points in the face image; and displaying a face attribute detection result of the face image to be detected, wherein the face image comprises a face image in a video frame sequence, and performing face attribute detection on the face image to be detected based on the face location result comprises:

performing, through a convolution portion of a convolutional neural network model, face attribute feature extraction on the face image to obtain a face attribute feature map;

determining, in the face attribute feature map, a Region of Interest (ROI) corresponding to each of at least one face key point;

performing, through a pooling portion of the convolutional neural network model, pooling processing on each determined ROI to obtain a pooled ROI feature map; and obtaining a preliminary face attribute detection result of an image of a current frame according to the ROI feature map of the image of the current frame in the video frame sequence; and obtaining a face attribute detection result of the current frame according to the preliminary face attribute detection result of the image of the current frame and a face attribute detection result of an image of at least one previous frame, wherein the at least one previous frame is one or more consecutive frames previous to the current frame, wherein before the performing, through the convolution portion of the convolutional neural network model, face attribute feature extraction on the face image, execution of the computer-readable instructions by the processor causes the processor to further implement:

obtaining a sample image for training the convolutional neural network model;

detecting the sample image for training to obtain information of the face key points; and training the convolutional neural network model by using the sample image and the information of the face key points.

\* \* \* \* \*